United States Patent [19]

Burgkhardt et al.

[11] Patent Number: 5,057,693

[45] Date of Patent: Oct. 15, 1991

[54] RADIATION DOSE READING APPARATUS

[75] Inventors: Bertram Burgkhardt, Karlsruhe; Ernst Piesch, Eggenstein-Leopoldshafen; Michael Vilgis, Baden-Baden, all of Fed. Rep. of Germany; Toru Ikegami; Motoyuki Sato, both of Shizuoka, Japan

[73] Assignees: Kernforschungszentrum Karlsruhe GmbH, Karlsruhe, Fed. Rep. of Germany; Toshiba Glass Co. Ltd., Tokyo, Japan

[21] Appl. No.: 583,023

[22] Filed: Sep. 17, 1990

[30] Foreign Application Priority Data

Sep. 18, 1989 [JP] Japan ................................. 1-239868

[51] Int. Cl.$^5$ .............................................. G01T 1/06
[52] U.S. Cl. ................................................ 250/484.1
[58] Field of Search ................. 250/484.1 C, 484.1 A, 250/337

[56] References Cited

U.S. PATENT DOCUMENTS 4,922,115 5/1990 Mawatari et al. ................ 250/485.1

FOREIGN PATENT DOCUMENTS 0292582 12/1986 Japan ........................... 250/484.1 C Primary Examiner—Carolyn E. Fields
Assistant Examiner—Drew A. Dunn

[57] ABSTRACT

In a radiation dose reading apparatus for a fluorescent glass element which was exposed to ionizing radiation and which is subjected to ultraviolet light radiation so as to cause fluorescence with an intensity depending on the radiation dose received by the glass element wherein the radiation dose is determined from the intensity of the fluorescence emitted from the glass elements detecting face, a fluorescence diaphragm arrangement is provided so as to overlay the glass element detecting face and is movable thereon for changing the fluorescence detecting areas and a fluorescence intensity reading device is provided for determining fluorescence intensity distribution and the glass element detecting face.

7 Claims, 21 Drawing Sheets

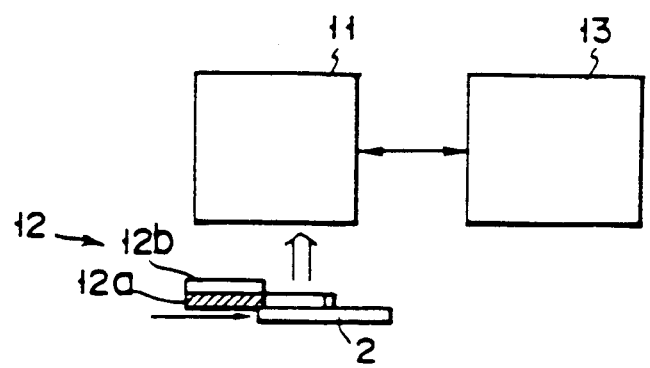
FIG. 1
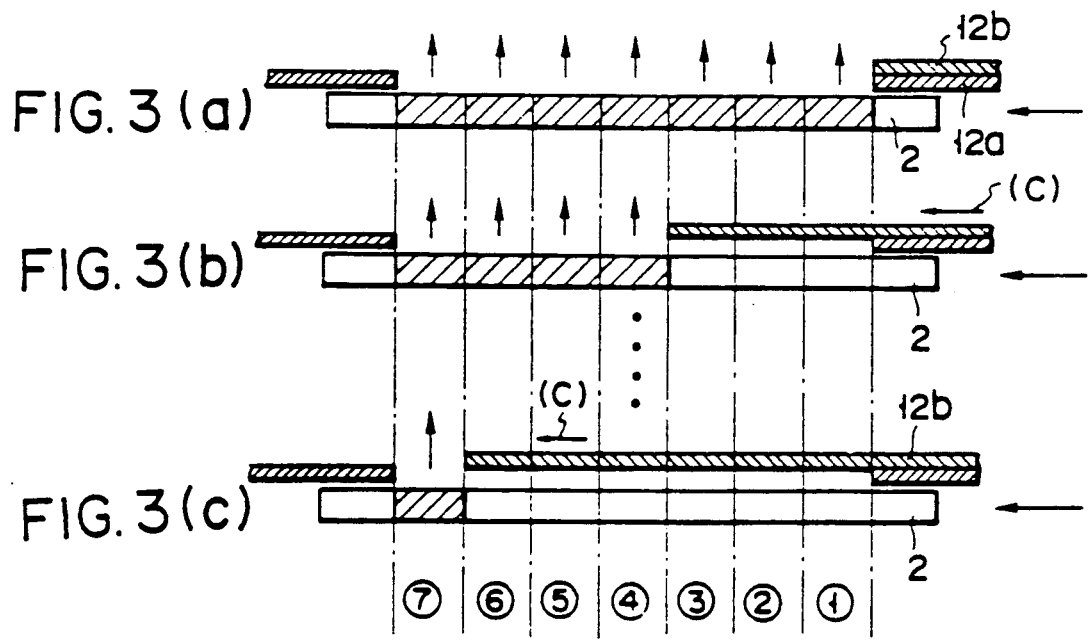

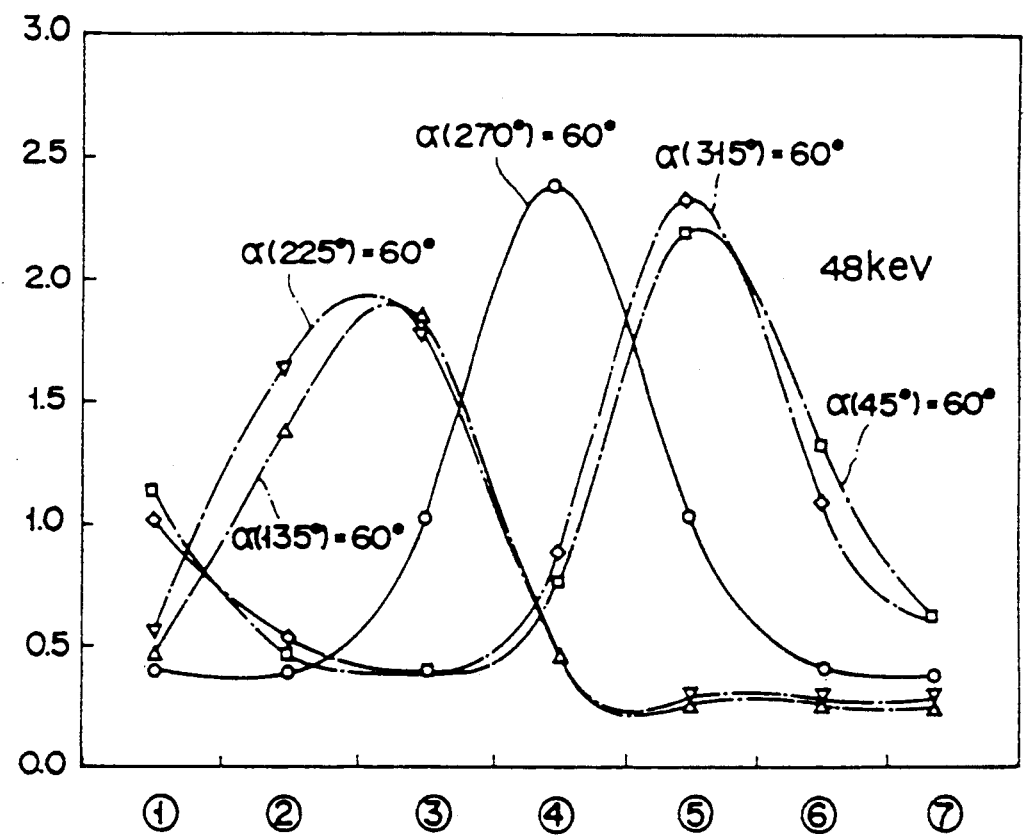
F I G. 5

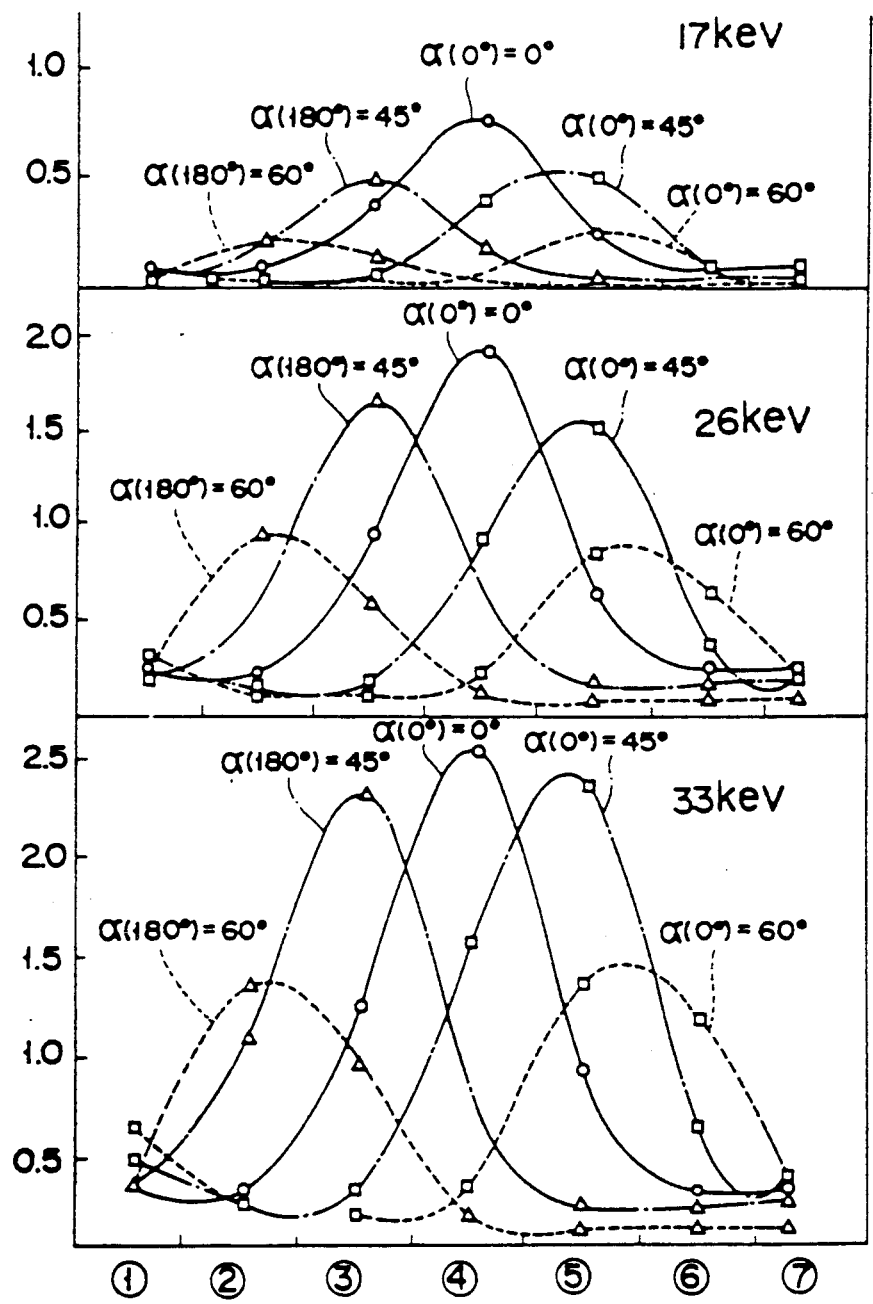
F I G. 7

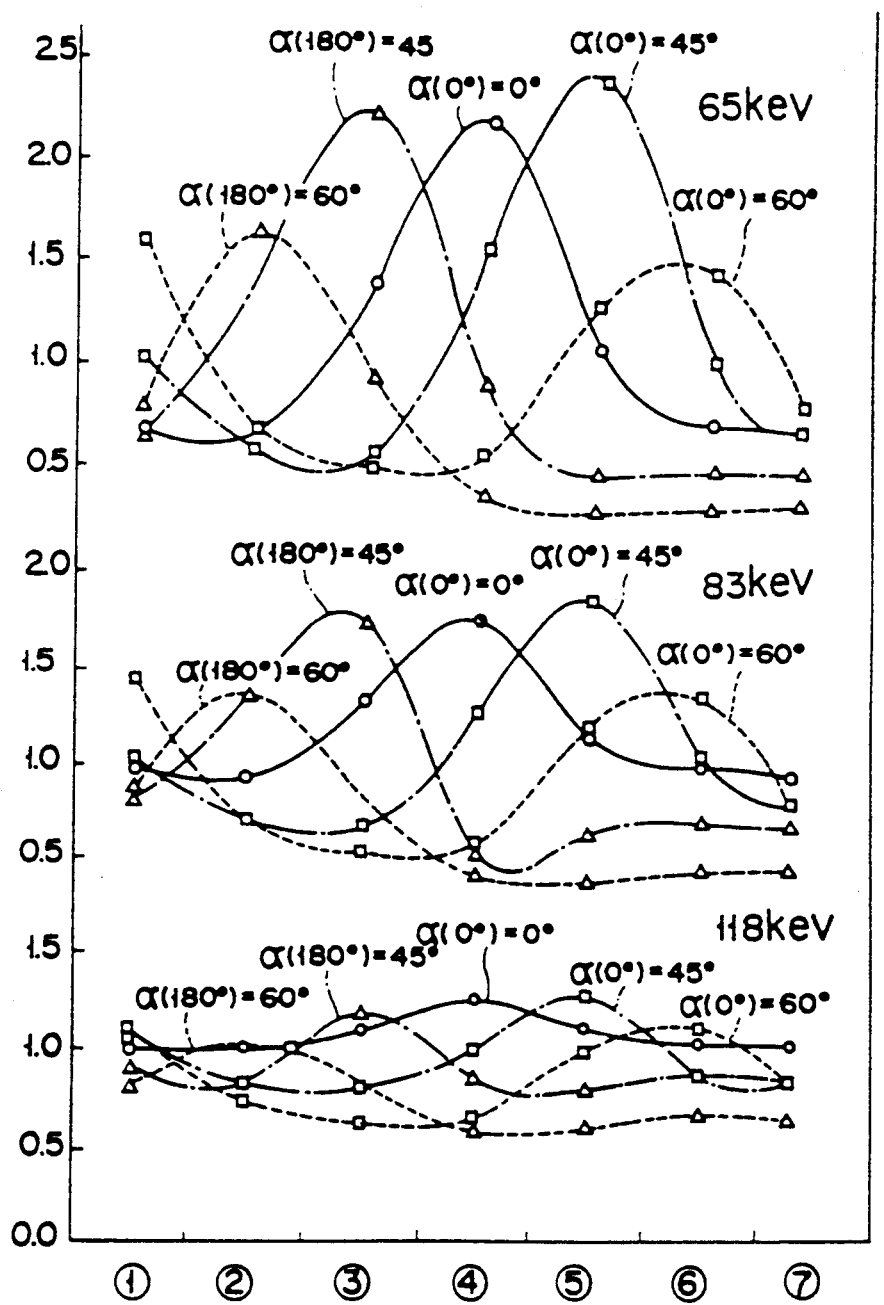
F I G. 8

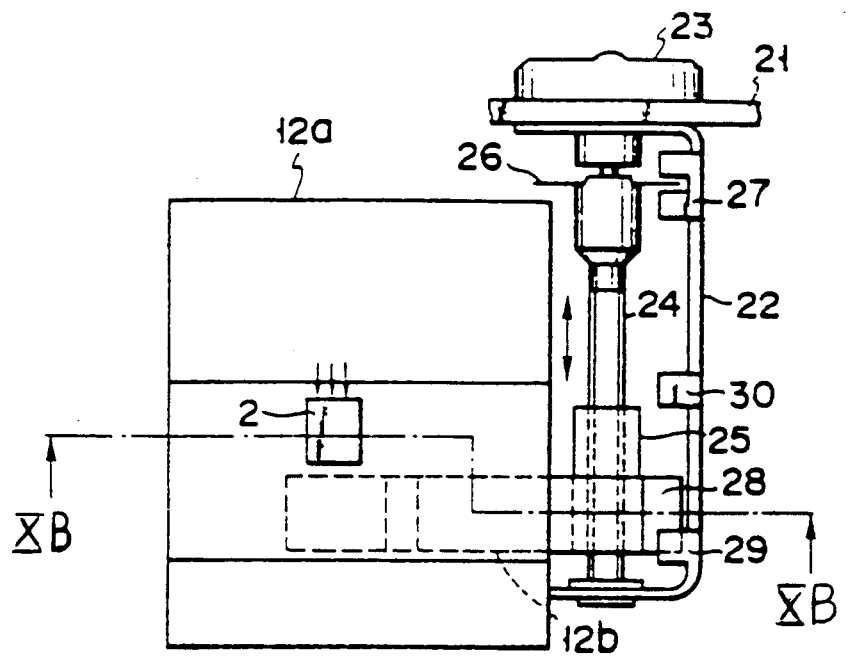
F I G. 10A
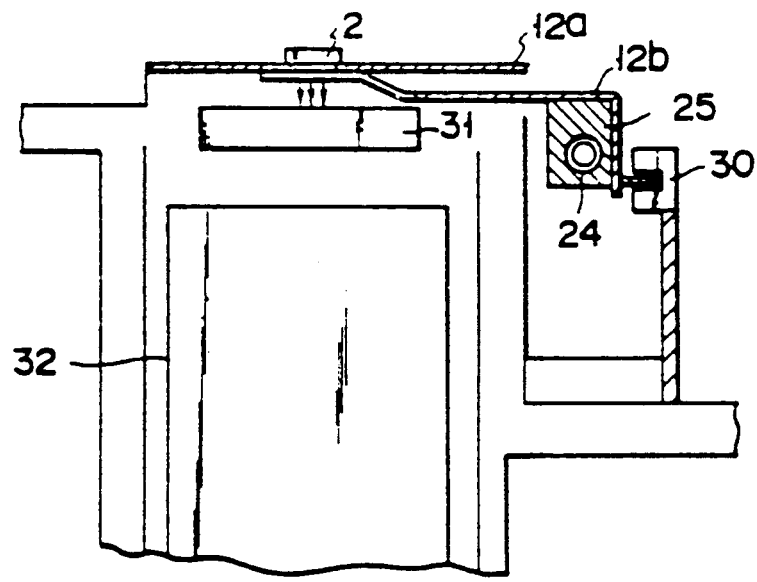
F I G. 10B

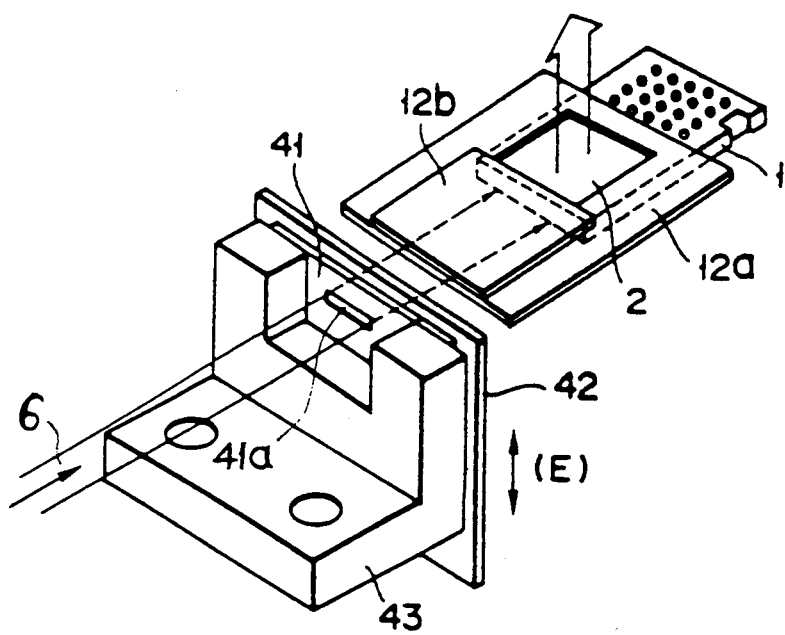
F I G. 12
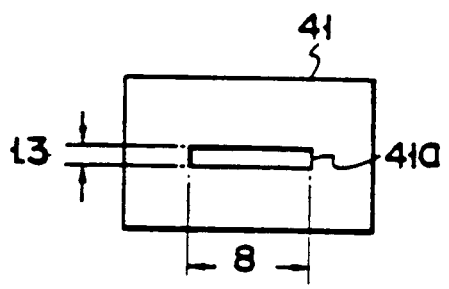 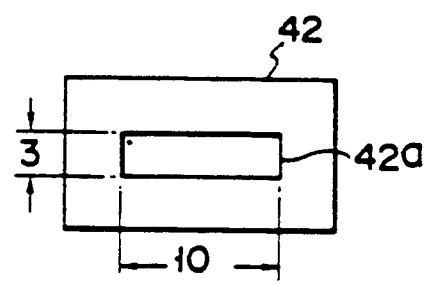
F I G. 13A    F I G. 13B

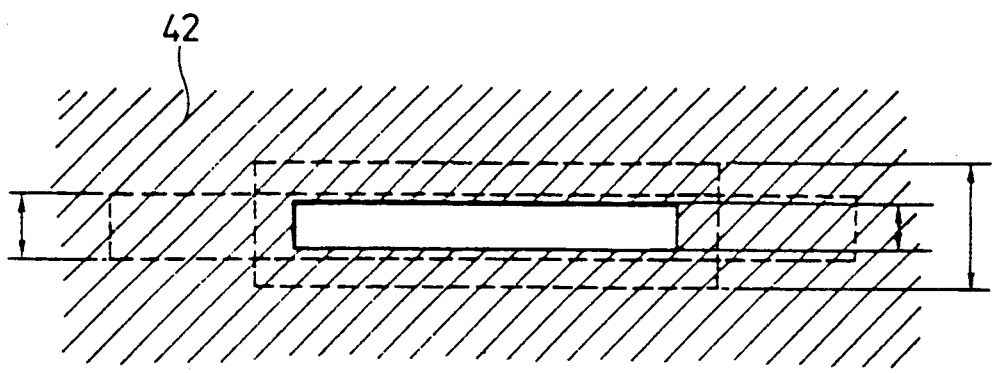
F I G. 14A
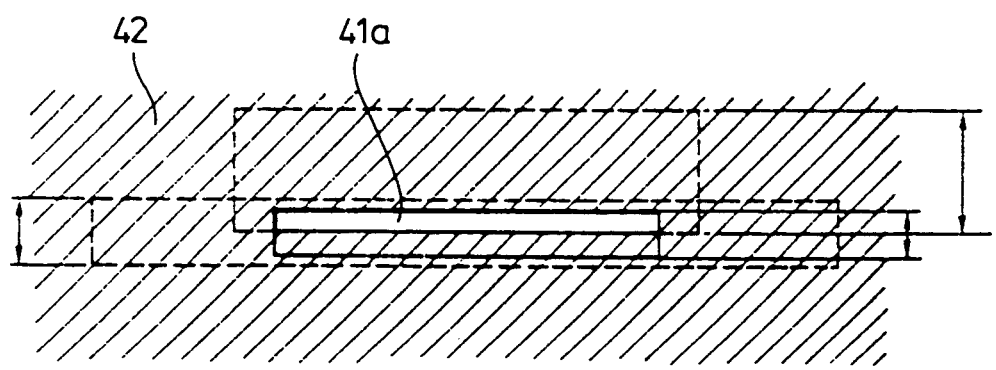
F I G. 14B
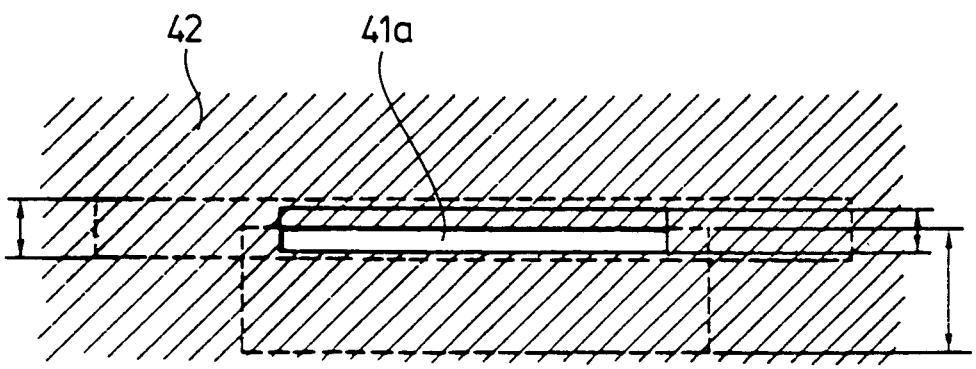
F I G. 14C

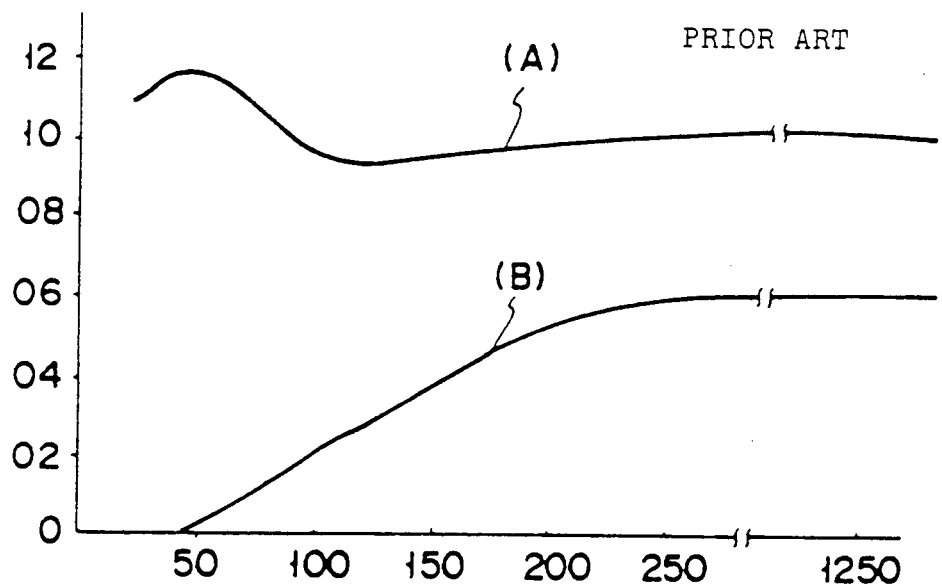
F I G. 23
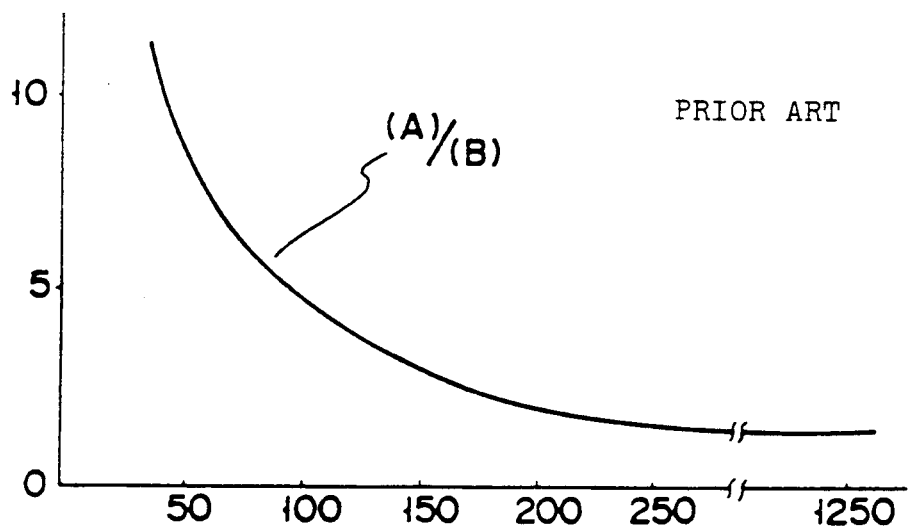
F I G. 24

RADIATION DOSE READING APPARATUS

BACKGROUND OF THE INVENTION

1. Field of the Invention

This invention relates to a radiation dose reading apparatus for reading radiation dose from a fluorescent glass element, and particularly to an apparatus for estimating the dose of radiation, the quality (energy) of radiation and the incidance direction of radiation rays.

2. Description of the Prior Art

Generally, a fluorescent glass element made of phosphate glass containing silver ions is used for reading radiation dose. After the fluorescent glass element has been exposed to ionizing radiation rays to be activated and be excited by ultraviolet rays having a wavelength of 300 to 400 nm, fluorescence is emitted from a predetermined face of the fluorescent glass element. By using the fact that the intensity of the fluorescence is proportional to the radiation exposure dose, the radiation exposure dose is measured from the intensity of the fluorescence.

Conventionally, there have been developed fluorescent glass dosemeters employing this principle. A conventional dosemeter has a structure as shown in FIG. 19 such that workers at radiation facilities measure the radiation exposure dose with the dosemeter by weaving it (see Japanese Patent Application No. Sho 62-334649). This fluorescent glass dosemeter is of portable type and is constructed in such a way that, after a fluorescent glass element 2 has been inserted in a glass element holder 1, the holder 1 is housed in a lower case 3 at a side thereof as shown by an arrow (A), and thereafter the lower case 3 is put in an upper case 4 as shown by an arrow (B). Reference numeral 5 shows a filter made of tin and attached to the inner face of the lower case 3 in order to compensate for the dependency of energy on radiation dose. Similarly, a filter made of tin is attached to the inner face of the ceiling of the upper case 4.

When the workers at the radiation facilities measure the radiation exposure dose after wearing the fluorescent glass dosemeter, an the radiation dose is read, the lower case 3 is pulled out from the upper case 4, and then the glass element holder 1 is removed therefrom. Thereafter, as shown in FIG. 20, ultraviolet rays 6 of a specific wave length, selected by an optical filter (not shown) disposed in the path of the ultraviolet rays are emitted thereto from a light source of exciting ultraviolet rays. They are substantially perpendicularly incident on a face of the fluorescent glass element 2. Then, fluorescence 7 is generated in the fluorescent glass element 2 made of silver activated phosphate glass by the excitation of the ultraviolet rays 6, and is taken out in a direction perpendicular to that of the ultraviolet rays 6. The fluorescence 7 within a specific wavelength range is selectively picked up through another optical filter (not shown) and is photoelectrically converted by a photomultiplier tube or the like. The intensity of the fluorescence, that is, the radiation exposure dose can be read from the output of the photoelectronic converter.

When the fluorescent glass dosemeter is used to measure the radiation exposure dose of individual persons, it is normally sufficient to measure only the dose. However, when an emergency arises in the facilities, or when a leakage of radioactive substance occurs because of insufficient shielding, or when the operator works for a long time and is exposed to a large radiation dose, not only the dose but also the quality of radiation and the incidence direction of the radiation must be detected in order to estimate and analyse the individual exposure of workers.

As described above, the filter 5 having a slit formed therein is attached to the inner face of the case so as to face the radiation exposed (irradiated) face of the fluorescent glass element 2. This filter 5 is effectively utilized to estimate the quality of radiation. For example, two diaphragms are employed for the estimation. One diaphragm 8 is shown in FIG. 21 and is used to measure the substantially whole fluorescence of the fluorescent glass element 2 when it is normally used for reading a dose. The other diaphragm 9 is shown in FIG. 22 and measures only the fluorescence produced from the part of the fluorescent glass element 2 to which rays and X-rays are irradiated through the filter 5. These diaphragms 8 and 9 are alternately placed on the fluorescent glass element 2, and the amounts of fluorescence 7 concerning workers at (A) and the fluorescence 7 concerning workers at (B) are read which pass the diaphragms 8 and 9, respectively. The quality of radiation can be estimated by obtaining the ratio of the fluorescence 7 workers at (A) to the fluorescence workers at (B).

FIG. 23 shows relative energy response curves (A), (B), so-called energy dependence of response, when the fluorescence of fluorescent glass element 2, to which the same dose of T-rays rays and X-rays is irradiated, is detected using the diaphragms 8 and 9 respectively. As shown in FIG. 24, the relative response ratios can be obtained by calculation (A/B). Accordingly, the qualities of irradiated $\gamma$-rays and X-rays can be estimated from the relative response ratios.

Problem that the Invention Intends to Solve

However, this conventional method of estimating the energy of radiation is encountered with a problem when the incidence direction of radiation rays on the dosemeter is inclined from the perpendicular line to the exposed face of the fluorescent glass element. Referring to FIG. 25a and 25b, let it be assumed that the perpendicular direction to the exposed face of the fluorescent glass element be $\alpha=0°$, the vertical upward direction be $\alpha(0°)=90°$, the vertical downward direction be $\alpha(180°)=90°$, and the horizontal leftward direction be $\alpha(90°)=90°$. The angles inserted between the parentheses indicate $\beta$'s. When, for example, the radiation rays are incident on the dosemeter in a direction of $\alpha(180°)=45°$ or $\alpha(180°)=60°$ as shown in FIG. 26, the curves of the relative response ratio (A/B) of the incident radiation rays for estimating the quality of radiation are flatter than those of the radiation rays incident in a direction of $\alpha=0°$. Thus, if radiation energy varies, very few changes occur in the relative response ratios, reducing the energy determination accuracy substantially.

This invention was made under the above circumstances, and an object thereof is to provide a dose reading apparatus in which a plurality of fluorescence intensity distributions are easily obtained, and the energy of radiation and/or the incident directions of radiation rays are determined at a high accuracy.

Another object of this invention is to provide a radiation dose reading apparatus in which the fluorescence detecting positions, the fluorescence detecting area and the like are changed by a simple changing mechanism, whereby fluorescence intensity distribution is easily and accurately obtained.

SUMMARY OF THE INVENTION

In order to solve the problem, the invention provides a dose reading apparatus which comprises a fluorescence diaphragm mechanism with a diaphragm having an opening of a predetermined area and a movable cover plate for changing in at least three steps the fluorescence detecting positions and/or the fluorescence detecting areas on the detecting face of a fluorescent glass element, and fluorescence intensity reading device for obtaining the fluorescence intensity distribution from the intensity of fluorescence emitted from the fluorescence detecting face of the fluorescent glass element in accordance with the selected one of the fluorescence detecting positions and/or the selected one of the fluorescence detecting areas on the detecting face of the fluorescent glass element.

An evaluation device for estimating the quality of radiation and/or the incidence direction of radiation rays is preferably provided.

Preferably the apparatus includes a fluorescence changing mechanism comprising a diaphragm formed with an opening having a predetermined area and a cover plate adapted to move in parallel with the diaphragm so as to change the fluorescence detecting position or area. The diaphragm may be used as a fluorescent glass loading plate and a tapered part is formed at the edge portion of the opening of the diaphragm and/or in the front portion of the cover plate such that the amount of the fluorescence is not influenced by the thickness of the diaphragm and/or the cover plate.

Further, an ultraviolet-ray diaphragm mechanism for changing the incident amount of ultraviolet rays may be provided in place of the fluorescence diaphragm mechanism.

Preferably two overlapped diaphragms are used as the fluorescence diaphragm mechanism and/or the ultraviolet ray diaphragm mechanism, and one of the diaphragms is moved to change the position and/or the area at the side of the fluorescence detecting face of the fluorescent glass element and/or the ultraviolet ray incident side thereof.

This invention has the following features:

The fluorescence detecting positions and/or the fluorescence detecting areas are changed in at least three steps and ultraviolet rays are emitted to the fluorescent glass element every time the change occurs The intensities of fluorescence emitted from the fluorescence detecting face of the fluorescent glass element are indications of fluorescence intensity distribution which correspond to the changed steps, thereby enabling the energy of radiation and the like to be correctly estimated.

The energy of radiation is estimated from the maximum and minimum values of each fluorescence intensity distribution, and also the incidence direction of the radiation rays is estimated from the fluorescence intensity distributions.

The shelter plate may be continuously or stepwise moved horizontally and in parallel with the diaphragm formed with an opening having an area corresponding to the fluorescence detecting face of the fluorescent glass element, thereby changing the fluorescence detecting positions and/or areas in a plurality of steps.

The diaphragm itself constitutes a glass element loading plate. The measurement of the fluorescent glass element is carried out only when the fluorescent glass element is put in a predetermined position on the diaphragm. Since a separate loading table is not required, the space in the apparatus is well utilized and the number of constituent elements of the apparatus is reduced.

If the tapered part extending towards the fluorescence measuring side are formed on the edge part of the opening of the diaphragm and the front part of the shelter plate, the required amount of fluorescence can be incident on the fluorescence intensity measuring evaluation device without being hindered by the thickness of the diaphragm and the cover plate.

Further, the incident positions and/or the incident area of the ultraviolet rays are changed in at least two steps by means of the ultraviolet rays diaphragm mechanism. By reading the intensity of fluorescence emitted from the fluorescence detecting face of the fluorescent glass element, a fluorescence intensity distribution is obtained which correspond to the respective steps, whereby the energy of radiation or the like is estimated.

Still further, the energy of radiation is estimated from the fluorescence intensity ratios and the incidence direction of radiation is estimated from a fluorescence intensity distribution, after the fluorescence intensity distributions have been obtained.

Preferably, two diaphragms are used. By moving either of them, the incident positions and incident areas of ultraviolet rays for the fluorescence glass element are easily changed.

BRIEF DESCRIPTION OF THE DRAWINGS

FIG. 1 shows a schematic structure of this invention;

FIGS. 3($a$), 3($b$) and 3($c$) are cross-sectional views taken along the arrows in FIGS. 2($a$), 2($b$) and 2($c$), respectively.

FIGS. 4 to 8 show the curves of relative fluorescence intensity at measuring positions with respect to various energies and incident angles (curves of fluorescence intensity distributions);

FIG. 10A and 10B show shows a mechanism for changing the positions and areas of the fluorescence detecting face, FIG. 10A being a plan view thereof, FIG. 10B being a cross-sectional view taken along line XB—XB in FIG. 10($a$)

FIG. 12 shows a mechanism for changing the incident positions and areas of ultraviolet rays;

FIGS. 13A and 13B are front views of a first diaphragm and a second diaphragm;

FIGS. 14A, 14B and 14C show the positional relations of the fluorescent glass element, the opening of the first UV diaphragm and the opening of the second UV diaphragm;

FIG. 15$b$ shows an energy response to the exposure dose in free air;

FIGS. 19 to 24 show a conventional dosimeter and reading equipment, FIG. 19 being a perspective view of a fluorescent glass dosemeter, FIG. 20 showing the excitation by ultraviolet rays and the direction of the fluorescence measurement for a fluorescent glass element held in a glass element holder, FIGS. 21 and 22 being views anticipating the changes of the position and areas upon estimating the quality of radiation, FIGS. 23 and 24 representing the amounts of fluorescence in FIGS. 21 and 22, respectively, FIGS. 25a and 25b and 26 the are presented to explain problems regarding incidence directions of radiation rays on the fluorescent glass element

DESCRIPTION OF THE PREFERRED EMBODIMENT

Embodiments of this invention will be described with reference to the drawings.

Figure 19:
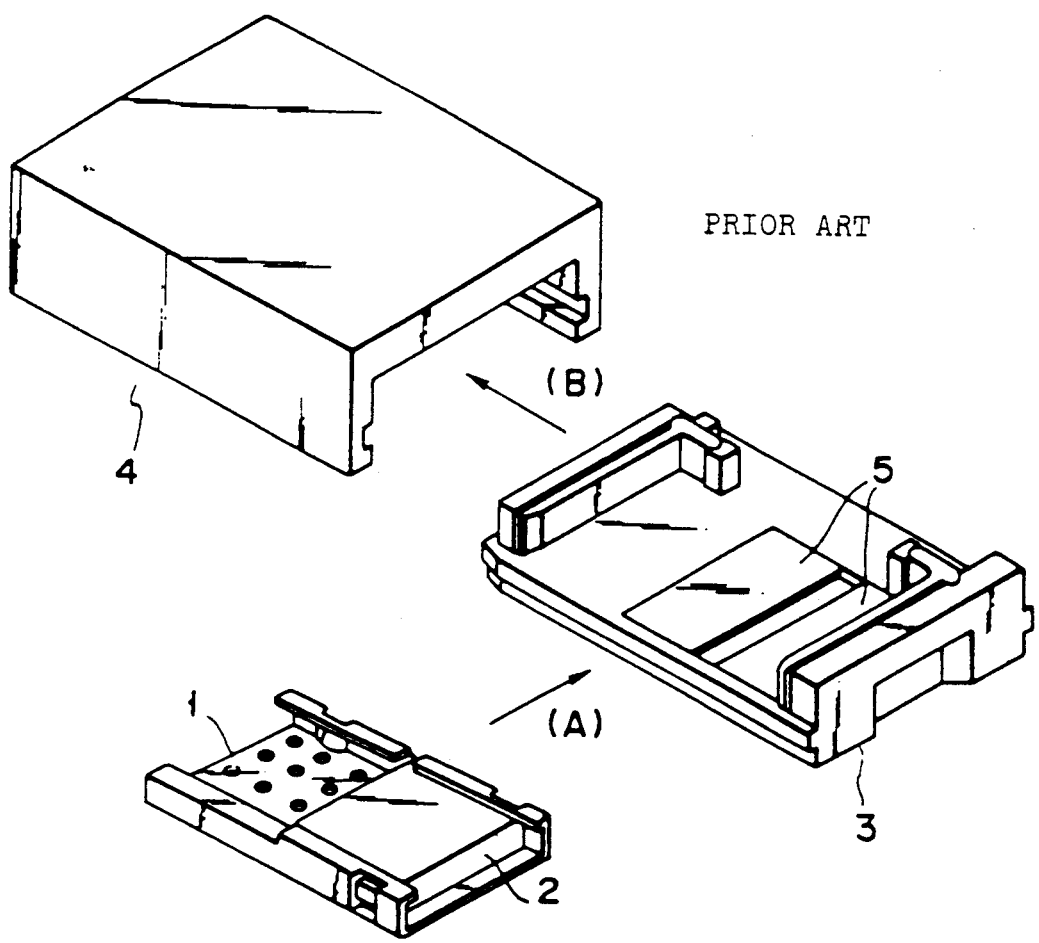
Figure 20:
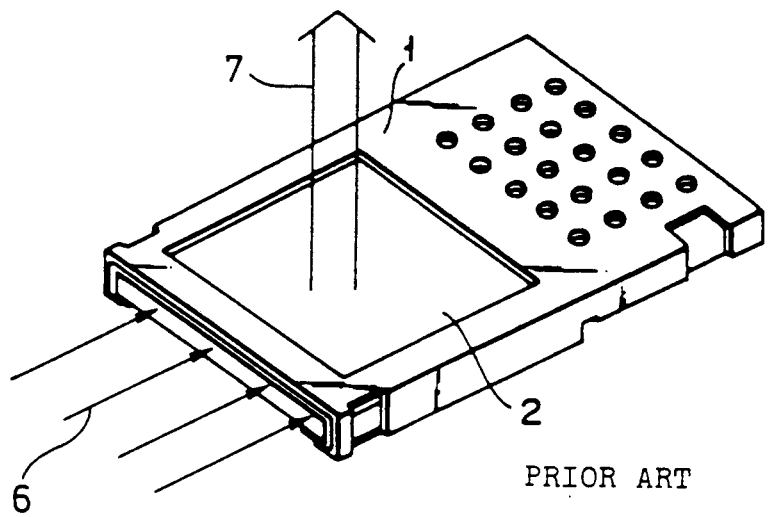
Figure 21:
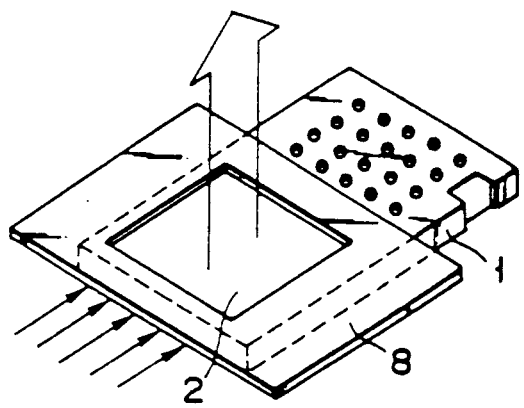
Figure 22:
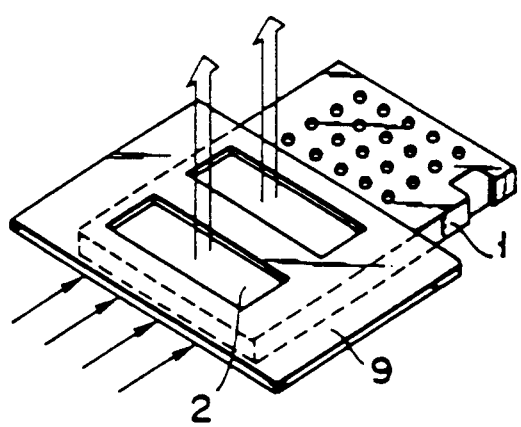

First, an embodiment of this invention will be explained with reference to FIGS. 1 to 3. The parts and elements which are similar to those of the prior art are denoted by the same referential numerals (see FIG. 19), and their detailed explanation will be omitted. When the workers at radiation facilities wear a fluorescent glass element 2, it is housed in cases 3 and 4 mounted in a glass element holder 1 in the same manner as a conventional fluorescent glass element. This being the case, only the reading system will be explained.

Figure 2A:
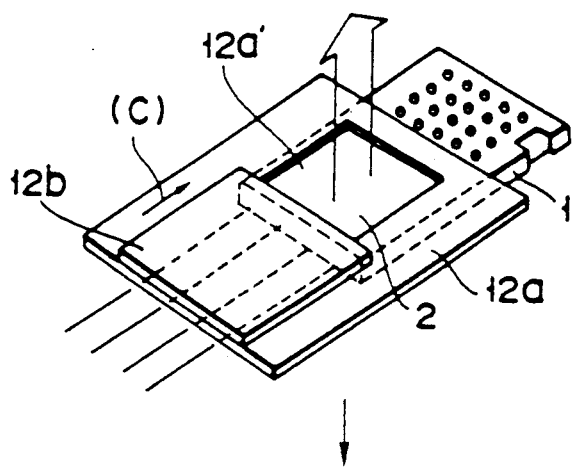
FIG. 2 is a perspective view of an embodiment, in which the changes of fluorescence detecting positions and areas on the fluorescence detecting face of a fluorescent glass element are shown.
Figure 2B:
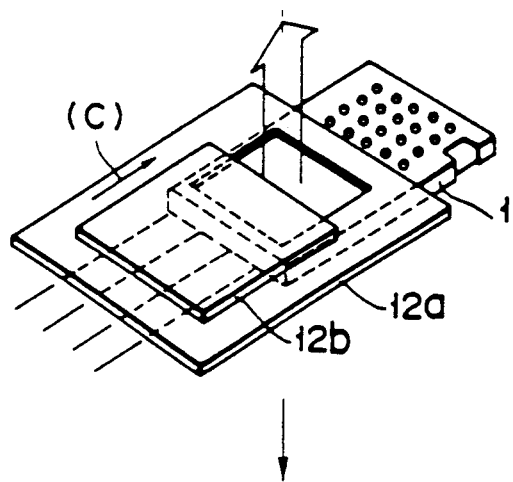
Figure 2C:
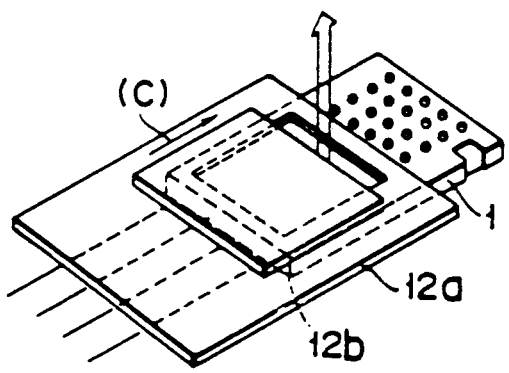

First, a fluorescence diaphragm mechanism 12 is provided between the fluorescent glass element 2 and fluorescence intensity reading device 11. As shown in FIG. 2(a) to 2(c), the mechanism 12 comprises a diaphragm 12a formed with an opening 12a' having the substantially same area as that of the wider part of the fluorescent glass element 2, and a cover plate 12b slidable on the upper face (for example) of the diaphragm 12a so as to cover 100% to 0% (for example) of the opening 12a' of the diaphragm 12a. FIG. 3 is a cross-sectional view of the assembly of the fluorescent glass element 2 and the fluorescence diaphragm mechanism 12 taken along arrow (C) in FIG. 2(a), and shows the positional relationship between the fluorescent glass element 2, the diaphragm 12a and the cover plate 12b. At shown in FIG. 3, the cover plate 12b can be moved by for example motor horizontally by an equal length in the direction indicated by an arrow (C) in six steps. In the seventh step, the opening 12a' of the diaphragm 12 is fully covered with the cover plate 12b (that is, the uncovered area of the opening 12a' is 0%). The positional relationship of the elements in FIG. 2(a) corresponds to that in FIG. 3(a), and the opening 12a' of the diaphragm 12a is not limited by the cover plate 12b (that is, the uncovered area of the opening 12a' is 100%). The positional relationship of the elements in FIG. 2(b) corresponds to that in FIG. 3(b), and the uncovered area of the opening 12a' is approximately 57%. FIG. 2(c) corresponds to FIG. 3(c), and the uncovered area of the opening 12a' is approximately 15%.

A plurality of cover plates 12b each formed with a slit having a different area may be successively placed on the diaphragm, or a cover plate having a slit may be moved in the direction shown by the arrow (C) to change the fluorescence detecting positions.

The fluorescence intensity reading device 11 has a function of obtaining the later described fluorescence intensity distributions or the like by measuring the intensities of fluorescence emitted from the fluorescence detecting face of the fluorescent glass element 2 through the opening 12a' as the cover plate 12b is moved horizontally by equal amounts in six steps. As a hardware, it has a CPU conducting operation in accordance with a predetermined sequence program, a signal converter for changing the fluorescence intensity to a required signal, memory device for storing the read-out value of the fluorescence intensities for arbitrary opening areas of the opening 12a', the previously obtained fluorescence intensity distribution for each energy and the ratio of the maxi mum value to the minimum value of each energy as described later with reference to FIG. 9 and device required for data processing.

Evaluation device means 13 determines the energy of radiation and the incidence direction of radiation based on the fluorescence intensity distribution obtained by the fluorescence intensity reading device 12.

In operation, it is necessary to move the fluorescent glass element housed in the cases 3 and 4 to a predetermined place. There, the lower case 3 is pulled out from the upper case 4, and then the glass element holder 1 is removed from the lower case 3. Thereafter, the holder 1 containing the fluorescent glass element diaphragm is carried to a predetermined measuring place, and is fixedly set on such a measuring table.

Referring to FIG. 2(a) to 2(c), as the ultraviolet rays 6 are emitted from the exciting ultraviolet ray source to the fluorescent glass element 2, fluorescence 7 is emitted from the fluorescence detecting face of the fluorescent glass element 2. After passing the opening 12a' of the diaphragm 12a, the fluorescence 7 is incident on the fluorescence intensity reading device 11. First, the normal measurement of radiation dose is carried out when the cover plate 12b is in a position as indicated in FIG. 2(a) in which the opening 12a' of the diaphragm 12a is fully opened, that is, is opened at 100%. When the fluorescence intensity reading device 11 measures the fluorescence intensity over the predetermined threshold values, the energy of radiation and the others are estimated. The measurement of the energy of radiation may be carried out by using the diaphragms 12a having an arbitrary area. With this embodiment, however, the cover plate 12b is disposed on the upper face of the diaphragm 12a. As the cover plate 12b is horizontally moved by a motor in six equal steps in the direction indicated by the arrow (C) in FIGS. 3(b) and 3(c) the intensity of fluorescence detected from the fluorescence detecting face of the fluorescent glass element 2 is read in every step. Accordingly, the fluorescence intensity reading device 11 carries out the measurement seven times in total if the measurement at the time when the opening 12a' of the diaphragm 12a is fully opened (that is opened at 100%) is included. With this fluorescence intensity reading device 11, the fluorescence intensity distributions are obtained by the differences of the read-out values calculated by a CPU or the like.

FIGS. 4 to 8 show the fluorescence intensity distributions in which radiation energy and the incident angles of radiation are changed, for the purpose of understanding this invention. As seen from these figures, in the low energy ranges of T-and X-rays under 150 KeV, different intensity distributions are obtained due to the excessive responsiveness and the abovementioned cover effect of the fluorescent glass element at the glass part on which y and X-rays are incident through the slit part between the paired filters 5 attached to the cases 3 and 4 made of plastics material and at the glass part where T-and X-rays penetrate through the filter 5. Accordingly, different fluorescence-intensities are obtained according to the energy and/or the incident angles of T-and X-rays.

Figure 4:
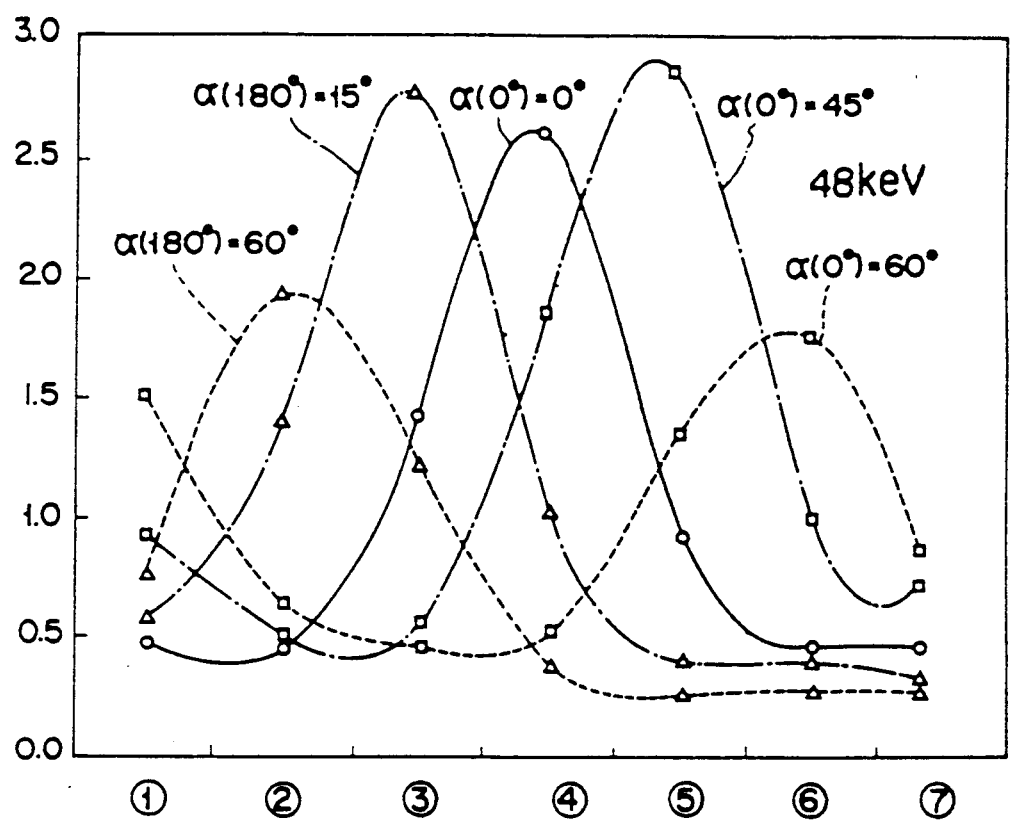
Figure 6:
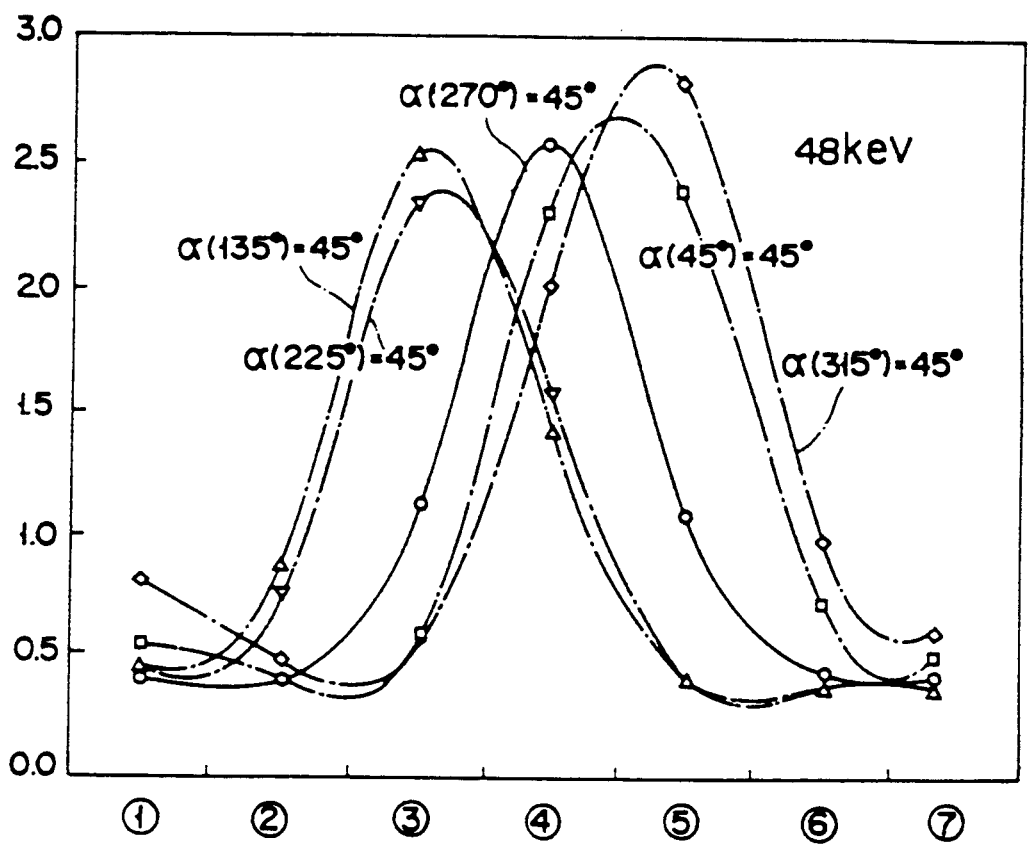

FIGS. 4 to 6 show the fluorescence intensity distribution charts when the fluorescent glass element 2 is irradiated with the X-rays of effective energy of 48 KeV. FIG. 4 shows the fluorescence intensity distribution chart when the fluorescent glass element is irradiated at different angles with $\beta=0$ and $\beta=180°$ (see FIG. 25a and 25b and 26) selected as the datum angles. As seen from this figure, when the X-rays are incident on the front side of the emitting face of the fluorescent glass element under $\alpha=0°$, the peak value of the fluorescence intensity appears in the center of the fluorescent glass element 2. However, when $\alpha$ is equal to or more than 45° this peak value appears at a portion removed from the center of the fluorescent glass element 2. FIG. 5 shows the fluorescence intensity distribution when X-rays are irradiated at different $\alpha$ angles with $\alpha=60°$ selected as the datum angle, and FIG. 6 shows the fluorescence intensity distribution when the fluorescent glass element is irradiated at different angles $\beta$ with $\alpha=45°$ selected as the datum angle. FIGS. 7 and 8 show the fluorescence intensity distribution charts of the fluorescent glass element on which X-rays having the energy of 17 KeV, 26 KeV, 33 KeV, 65 KeV, 83 KeV and 118 KeV are incident at the angles $=0°$, $\beta=180°$, $\alpha=0°$, $\alpha=45°$ and $=60°$.

Figure 9:
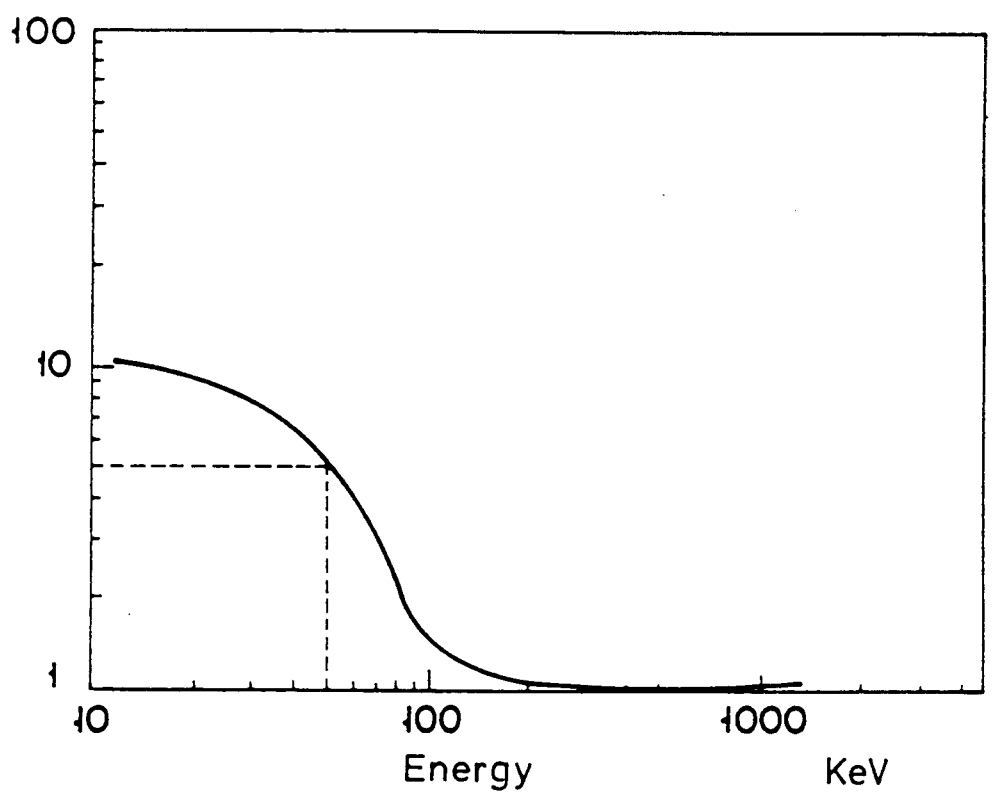
FIG. 9 shows a chart of the ratios of the maximum values of the fluorescence intensity distributions to the minimum values of the fluorescence intensity distributions.

After the fluorescent intensity distributions of a single fluorescent glass element have been obtained for respective energy in the seven measuring positions, the ratios of the maximum values to the corresponding minimum values are obtained as shown in FIG. 9. In the chart of FIG. 9, the ratios differ from each other according to the amounts of energy, that is, the energies of radiation. When, for example, $\alpha$ is in the range between 0° to 60°, the similar curves are obtained for $\beta=0°$ and $\beta=180°$, and the ratios are approximately 1 for the radiation energy of more than 150 KeV. However, the ratios are greatly increased for the emitted energy of less than that value.

In accordance with this invention, the memory device of the fluorescence intensity reading device 11 stores the curves as shown in FIG. 9 in advance. After the fluorescence intensity distributions have been obtained, the ratio of the maximum value to the minimum value of the fluorescence intensity distribution is evaluated.

When the fluorescence-intensity reading device 11 judges that the ratio exceeds 1, that is, the energy is less than 150 KeV, the evaluation device 13 estimates the value of the energy of radiation. If the measured ratio is 5, the value of the energy of radiation is estimated to be 50 KeV, as seen from FIG. 9. Referring to FIG. 4, the incident directions are judged by the places where the peak values appear. When the peak value appears at the right side (for example, at the position 6), it is considered that with respect to the person (see FIG. 25a and 25b) the radiation comes from the top, while when the peak value appears at the left side (for example, at the position 2), it is assumed that the radiation comes from the bottom.

With this embodiment, the intensities of fluorescence from the fluorescent glass element 2 are read by changing the areas of the opening 12a' of the diaphragm 12a (that is, the fluorescence detecting positions and/or areas) by means of the shelter plate 12b, and the fluorescence intensity distribution for each fluorescence detecting position and/or area. The quality of radiation is also easily obtained based on the ratio of the maximum value to the minimum value of each fluorescence intensity distribution. Further, the incidence direction of the radiation is easily assumed from the positions at which the peak values appear such that with respect to the radiation protection of workers the actual radiation exposure is accurately determined.

Figure 11A:
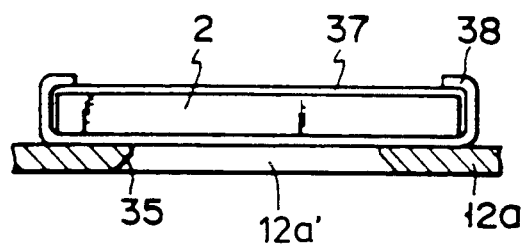
FIGS. 11A and 11B show the tapered part in the periphery of the opening of a diaphragm and in the forward part of a shelter plate.
Figure 11B:
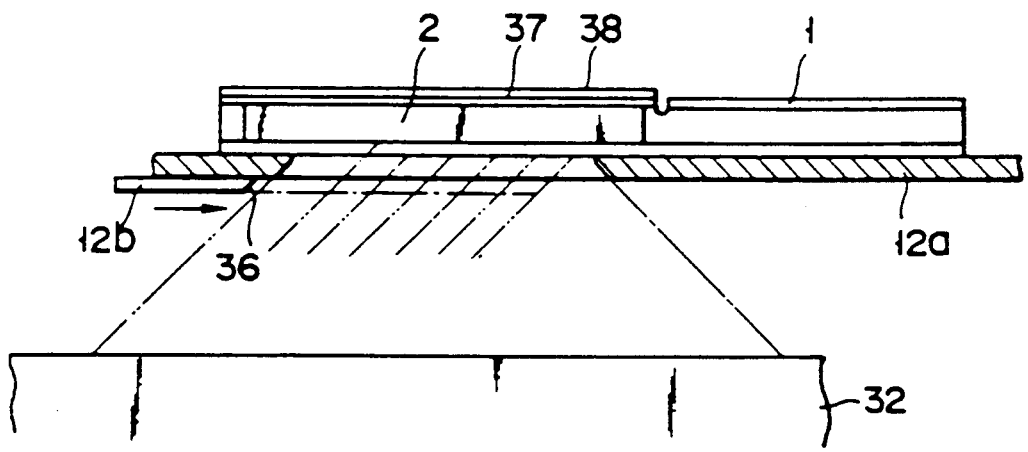

An embodiment of the invention as claimed in claim 4 will be explained with reference to FIG. 10A and 10B. FIG. 10A is a plan view, and FIG. 10B is a cross-sectional view taken along line XB—XB of FIG. 10A. Generally, the fluorescent glass element 2 is placed on a measuring table or a glass element loading plate in a predetermined position. However, with this invention, the diaphragm 12a is also used as a fluorescent glass element loading plate. A U-shaped member 22 has an arm connected to a frame 21 and the other arm fixed by a diaphragm 12a (FIG. 11A) having an opening 12a' and functioning as a glass loading plate. A positioning motor 23 is mounted on the face of the frame 21 opposite to its face to which the U-shaped part 22 is connected. To the rotating shaft of the motor 23 is fixed a screw shaft 24 which bridges the two arms of the part U-shaped part 22. A-block 25 is engaged with the screw shaft 24 so as to be moved in the directions indicated by an arrow. A cover plate 12b extends from the block 25 along the lower face of the diaphragm 12a. Referential numerals show a circular slit plate (26), a rotation checking sensor (27), a check piece (28), an original point checking sensor (29) and a final point checking sensor (30), respectively. Further referential numerals denote an optical filter (31) and a photoelectronic converting element (32), respectively. FIG. 11B shows the hole glass element holder 1 wherein the fluorescent glass element 2 is firmly held on the diaphragm 12a by means of an innerframe 37 and an outer frame 38 of the glass bolder element.

After the fluorescent glass element 2 has been placed on the diaphragm 12a at the predetermined position, ultraviolet rays are supplied to the fluorescent glass element 2 in such a manner as shown in FIG. 10A to excite the element 2. The photoelectronic converting element 32 which receives fluorescence emitted from the fluorescence detecting face of the fluorescent glass converts the fluorescence emitted from element 2 through the optical filter 31 to an electric signal. Thus, the fluorescence intensity is read in the state in which the opening area of the opening 12a' of the diaphragm is 100%, and the fluorescence intensity is measured from this read data.

Thereafter, the positioning motor 23 is driven to move the block 25 towards the motor 23 such that the cover 12b slides on the lower face of the diaphragm 12a in the direction to reduce the opening area of the opening 12a'. The rotation checking sensor 27 detects the number of rotations of the circular slit plate 26 fixed to the screw shaft 24 connected to the rotating shaft of the motor 23, and stops the motor 23 every time the circular slit plate 26 rotates by a predetermined number of rotations. After then, the fluorescence intensity distribution is similarly obtained by reading the intensity of fluorescence emitted from the fluorescent glass element 2. Further, when the positioning motor 23 has completed a predetermined number of rotations and the check piece 28 reaches the final point checking sensor 30, the sensor 30 produces an end signal, and the reading of the intensities of fluorescence produced from the fluorescent glass element 2 ends.

With this embodiment, the diaphragm 12a is also constructed as a glass element loading plate. Thus, the number of the constituent parts is reduced, and the space in the apparatus is well used. Since the fluorescent glass element 2, the diaphragm 12a and the cover plate 12b are arranged from the bottom to the top in this order, the distance between the fluorescent glass element 2 and both the diaphragm 12a and cover plate 12b is shorter than that of the corresponding elements arranged reversely. The provision of the cover plate 12b movable horizontally by the positioning motor 23 in the direction to reduce the opening area of the opening 12a' of the diaphragm 12a and the rotation checking sensor 27 enables the opening area of the diaphragm 12a to be arbitrarily set so as to read the fluorescence intensities.

An embodiment of the invention as claimed in claim 5 will be explained with reference to FIG. 11A and 11B. The inner periphery of the opening 12a' of a diaphragm 12a and the front part of the cover plate 12b horizontally slidable on the lower face of the diaphragm 12a are respectively formed at the edges with tapered portions 35 and 36 whose opening areas are increased from the fluorescence generate side to the fluorescence measuring side. Within the glass holder element 1, the fluorescent glass element 2 is held by an inner frame 37 and an outer frame 38.

With this embodiment, the formation of the tapered part in the opening 12a' of the diaphragm 12a and the shelter plate 12b interrupts less fluorescence than an apparatus with no tapered portion. Thus, even if these parts are thick, a sufficient amount of fluorescence is detected, and the fluorescence intensity reading part 32 accurately reads the fluorescence produced from the predetermined opening area.

Another embodiment of the invention will be explained with reference to FIGS. 12 to 15. The structure of this embodiment is almost the same as that of the first embodiment except for an ultraviolet radiation changing arrangement. Instead of the arrangement for changing the fluorescence detecting positions and/or fluorescent detecting areas on a fluorescent glass element 2, this ultraviolet radiation changing arrangements is used to change the incident positions and/or the incident areas of ultraviolet radiation on a fluorescent glass element 2. FIG. 12 shows an arrangement in which exciting ultraviolet rays 6 are supplied to the fluorescent glass element 2 by the ultraviolet radiation changing arrangement. This ultraviolet radiation changing arrangement comprises a first diaphragm 41 for setting an incident area of the ultraviolet rays 6 at a normal time and a second diaphragm 42 slidable on the rear face of the first diaphragm 41 in a direction as a shown by an arrow (E). The first diaphragm 41 is fixed to a reversed L-shaped part 43 and has formed therein an opening 41a on the incident path of the ultraviolet rays as shown in FIG. 13(a). If the thickness of the fluorescent glass element 2 is 1.5 mm and 16 mm in length, the area of the opening 41a is for instance 1.3 mm in width and 8.0 mm in length. In the second diaphragm 42 an opening 42a is formed having a width of 3 mm and a length of 10 mm.

There will be explained the method of measuring the fluorescence intensities in which the incident positions and the incident areas of the ultraviolet rays are changed by moving the diaphragm in the direction shown by the arrow (E) and the fluorescence intensities are measured. First, the cases 3 and 4 (FIG. 19) holding the fluorescent glass element 2 are transported to a required place, and then the fluorescent glass element 2 is similarly removed from the cases 3 and 4. After that, the fluorescent glass element 2 is brought to the fluorescence measuring position. Thereafter, the ultraviolet rays are emitted from an ultraviolet ray source to the fluorescent glass element 2 through the opening 41a of the diaphragm 41 and the opening 42a of the diaphragm 42, and fluorescence 7 is emitted from the fluorescence detecting face of the fluorescent glass element 2. In this stage of UV excitation, the opening area of the opening 12a' is foreseen changed by horizontally moving the cover plate 12b stepwise or continuously in order to obtain the fluorescence intensity distribution as mentioned above. The fluorescence 7 emitted from the fluorescence detecting face of the fluorescent glass element 2 is read by changing the incident positions and the incident areas of the ultraviolet rays 6. Thus, the vertical fluorescence intensity distribution is obtained from the ultraviolet rays by the fluorescence intensity reading device 11 and the quality of radiation and the incidence direction (font or rear) are estimated by the evaluation device 13 as explained above.

At the normal time, the radiation dose measurement is carried out in the state in which the opening 41a of the diaphragm 41 and the opening 42a of the diaphragm 42 coincide with each other, as shown in FIG. 14A, such that the ultraviolet rays 6 are incident on the substantially whole depth of the fluorescent glass element 2. When the intensity of the fluorescence from the fluorescent glass element 2 exceeds a predetermined threshold value, the energy of radiation is considered in the following manner. As shown in FIGS. 12, 14B and 14C, the diaphragm 42 is driven alternately upward and downward by a positioning motor or the like such that the upper half and the lower half of the opening 41a of the diaphragm 41 are alternately opened. Then, the fluorescence intensities are read and the fluorescence intensity distributions are obtained. As a result, the fluorescence intensities in the upper half and the lower half of the fluorescent glass element 2 are obtained separately.

Generally, X-rays in the low energy range under 30 KeV are easily absorbed in the glass itself. When the fluorescent glass element 2 is irradiated, fluorescence is produced preferable near the glass surface. Therefore, the ratio of the fluorescence intensity from the ultraviolet ray incident into the lower half to the fluorescence intensity from the ultraviolet radiation incident into the upper half of the fluorescent glass element 2 that is the ratio of the fluorescence intensity in FIG. 14(c) to the fluorescence intensity in FIG. 14(b)) is shown by the curve in FIG. 15(a).

Figure 15A:
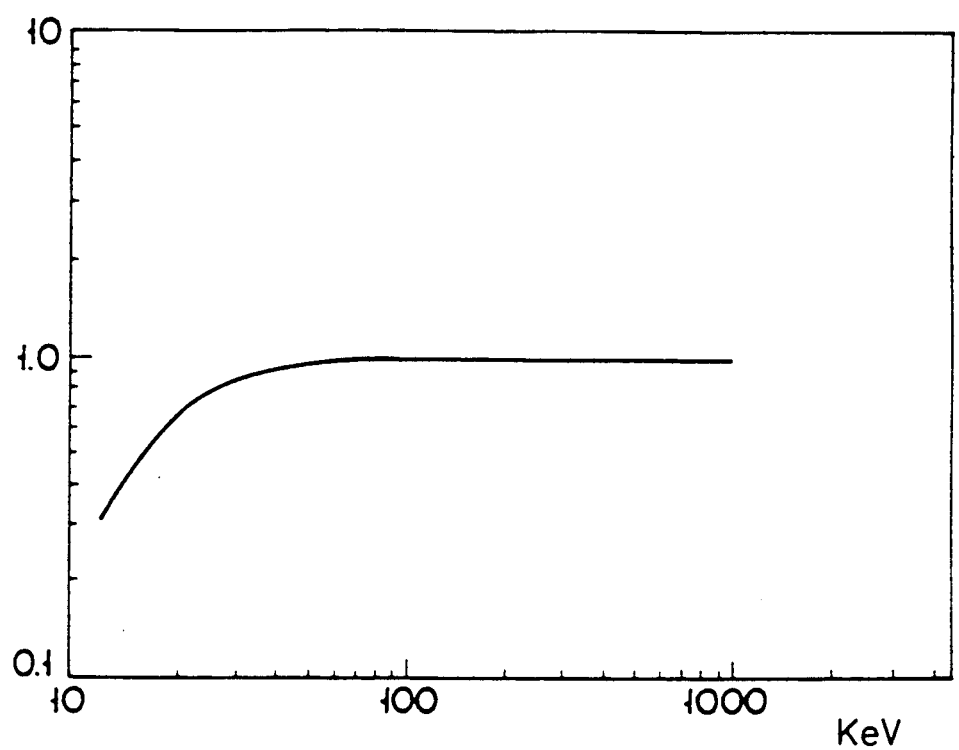
FIG. 15($a$) shows a relative reading ratio with respect to energies.
FIG. 15c shows a relationship between the ratio of FIG. 15 a and the correction factor.
Figure 15:
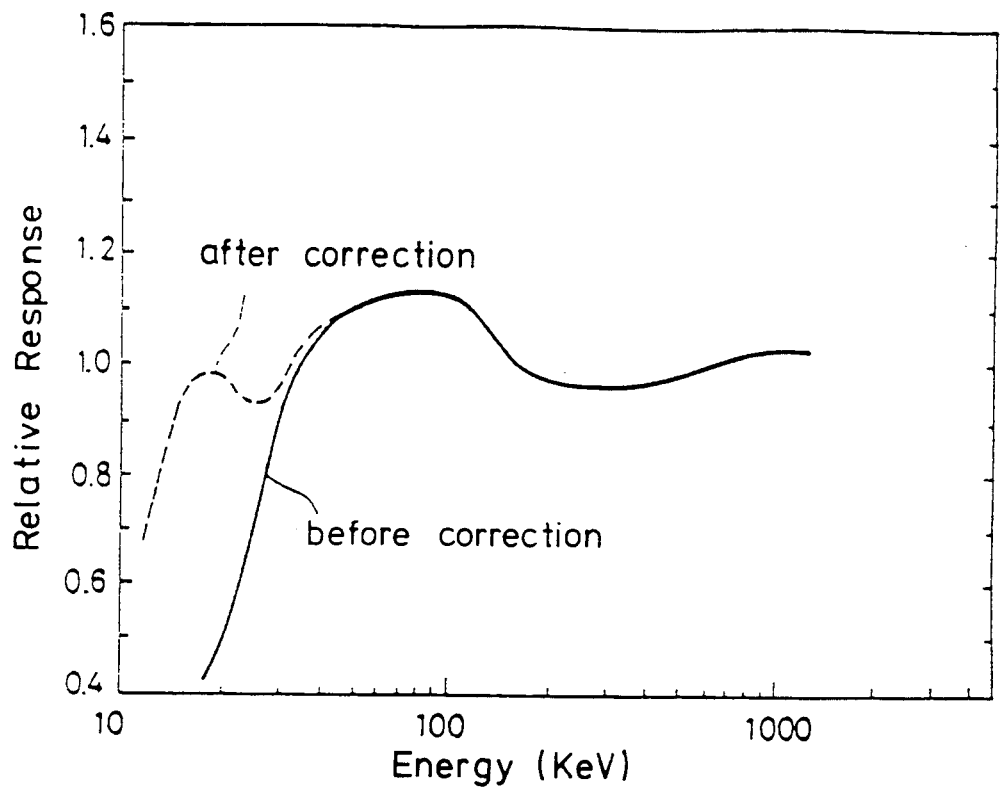
Figure 15:
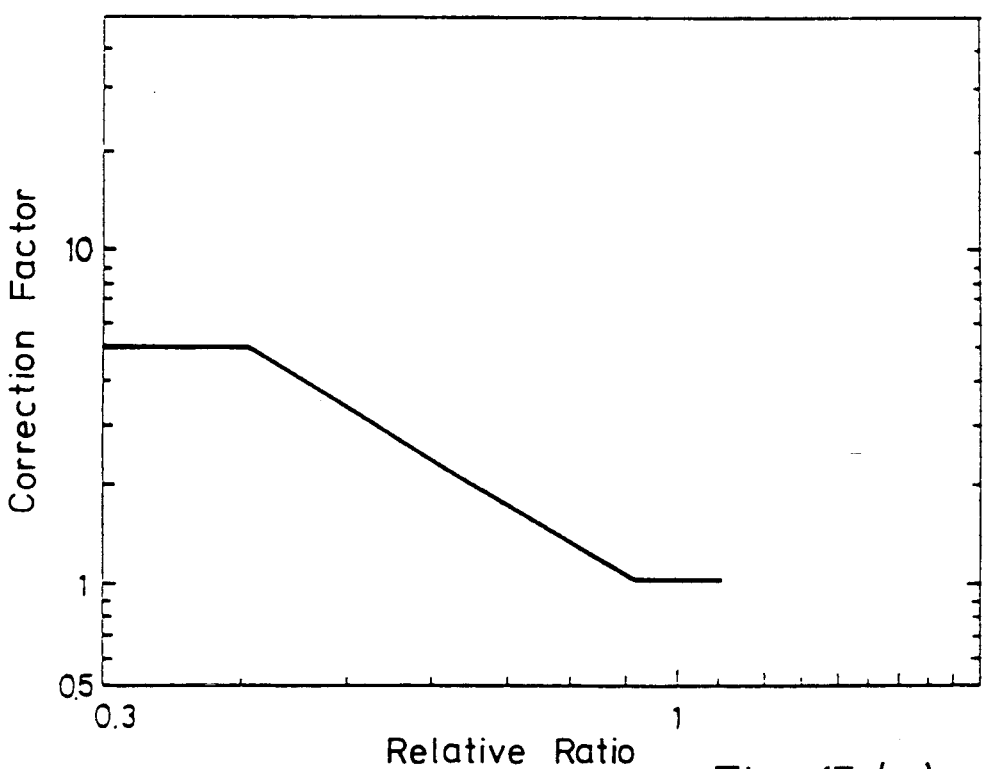

As clearly seen from FIG(a), the relative reading ratio is 1 for the energy of T-rays or X-rays above 30 KeV, but is substantially less for the energy under 30 KeV. The data of the curve as shown in FIG. 15(a) is stored in the evaluation device 13 as fluorescence intensity reading, and the energy of irradiated T-rays or X-rays is checked as to whether it is above 30 KeV. If the energy is less than 30 KeV, the relative reading ratio is obtained from the ratio of the fluorescence intensity in FIG. 14C to the fluorescence intensity in FIG. 14B. The quality of radiation is estimated from the data of the curve obtained from the relative reading ratio. In addition, the radiation direction from front or rear is deduced from the reading ratio. Furthermore, if the energy is less than 30 keV, the energy response to exposure dose in air is a little reduced as shown in FIG.(b). In this case, it is also possible to correct it by means of being multiplied by the correction factor based on the ratio information of FIG. 16(a). FIG. 15(c) shows a relationship between the said ratio and the correction factor. This relationship is previously stored in the reading apparatus, and the correction is carried out automatically.

Figure 16:
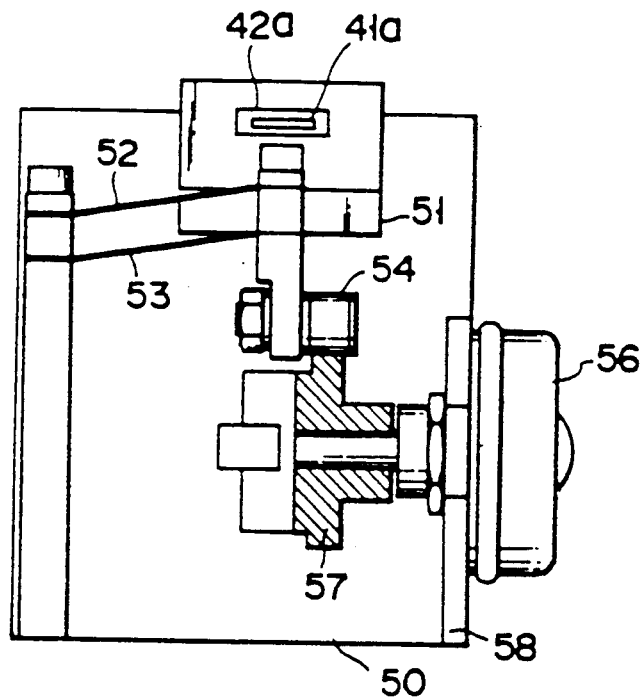
FIGS. 16 and 17 show a mechanism for changing the ultraviolet ray diaphragms, FIG. 16 being a front view thereof, FIG. 17 being a side elevational view thereof.
Figure 17:
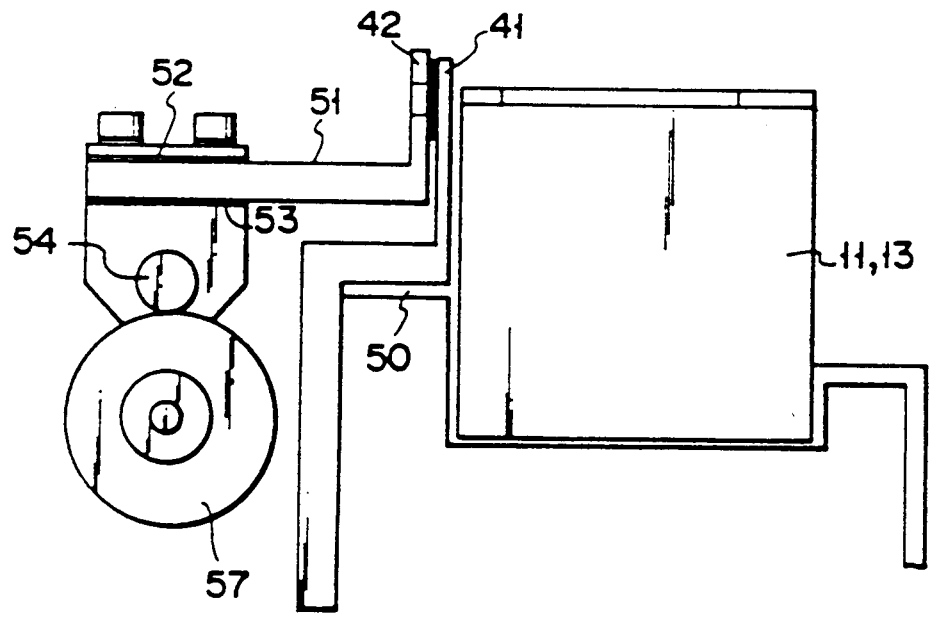

With the invention the diaphragm 42 may be disposed either on the front side or the rear side of the diaphragm 41. In FIG. 12, the diaphragm 42 is moved at the rear side of the diaphragm 41. However, the diaphragm 42 may be moved at the front side of the diaphragm 41, as shown in FIGS. 16 and 17. The diaphragm 41 having a narrow opening 41a corresponding to that of the diaphragm 41 in FIG. 13A is fixed to the front face of a reading device body 50 disposed at the ultraviolet incident side. The diaphragm 42 having a wide opening 42a corresponding to that of the diaphragm 42 in FIG. 13B is disposed at the ultraviolet ray incident side, that is, at the front side of the diaphragm 41 and is fixed to an L-shaped supporting part 51 (FIGS. 16, 17). The L-shaped supporting part 51 together with a cam follower 54 is supported by two parallel leaf springs 52 and 53 so as to be moved upward and downward due to the deformation of the leaf springs 52 and 53. The cam follower 54 is pressed against a cam 57 by the biasing force of the plate springs 52 and 53. Reference numeral 58 shows a supporting frame.

With the embodiment based on FIGS. 16 and 17, the cam follower 54 is normally held in contact with the cam 57 by the leaf springs 52 and 53 via the L-shaped supporting member 51. The position of the opening 42a of the diaphragm- 42 fixed to the L-shaped supporting member 51 is determined in accordance with the rotational position of the cam 57. Let it be assumed that a positioning motor 56 be rotated from an initial position in which an initial opening area is defined by the diaphragms disposed in an initial state. Then, the contact position of the cam 54 with the cam follower 57 moves upward and downward in accordance with the rotational angle of the motor 56. The diaphragm 42 is moved upward and downward in parallel with the fixed diaphragm 41. As a result, a required incident opening area of the ultraviolet rays is obtained, and the required incident position is set. Moreover, the incident opening area and position are easily controlled.

Figure 18A:
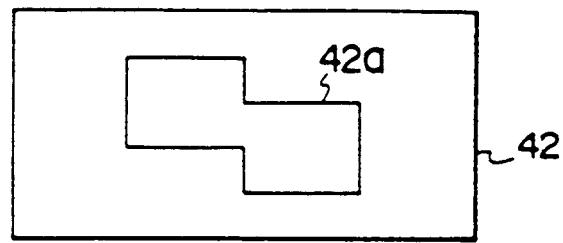
FIG. 18(a), 18[b, 18c and 18d shows the changes of the shapes and areas of the cross section of the UV beam when a diaphragm having a specific shape of the opening.
Figure 18B:
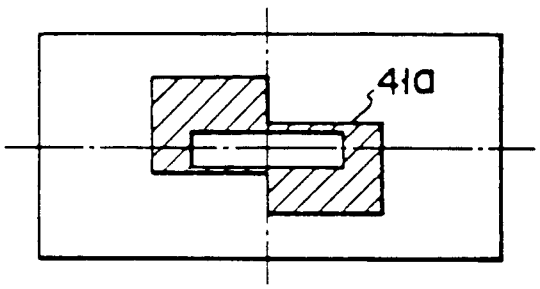
Figure 18C:
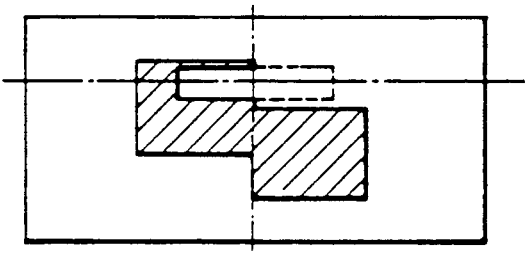
Figure 18D:
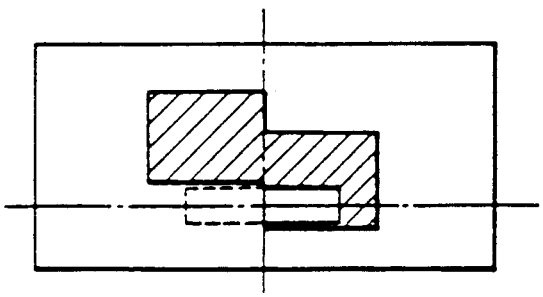

With this embodiment, two parallel leaf springs 52 and 53 are used. However, a slide mechanism may be used instead of them. Further, the movable diaphragm 42 may be formed with an opening 42a as shown in FIG. 18A. When the diaphragm 42 is moved upward and downward, the ultraviolet rays are divided into the lefthand part and the righthand part as shown in FIGS. 18C and 18D, and various opening areas and shapes are selected.

With all embodiments, the determination of the energy of radiation and the incident direction may be applicable not only to T-rays and X-rays but also to $\beta$-rays. The diaphragm 12a has a structure as shown in FIGS. 2 and 3, but it is not limited thereto. It may have another structure by which the fluorescence intensity distribution can be obtained in a similar way. For example, a diaphragm 12a provided with a slit having a width of 1/n-th of that of the fluorescence detecting face may be moved stepwise by the same amount of the slit width to read the fluorescence intensities, or a diaphragm 12a provided with a slit having a width of 1/n-th of that of the fluorescent glass element may be fixed and a fluorescent glass element may be moved stepwise by the same amount of the slit width.

Figure 25:
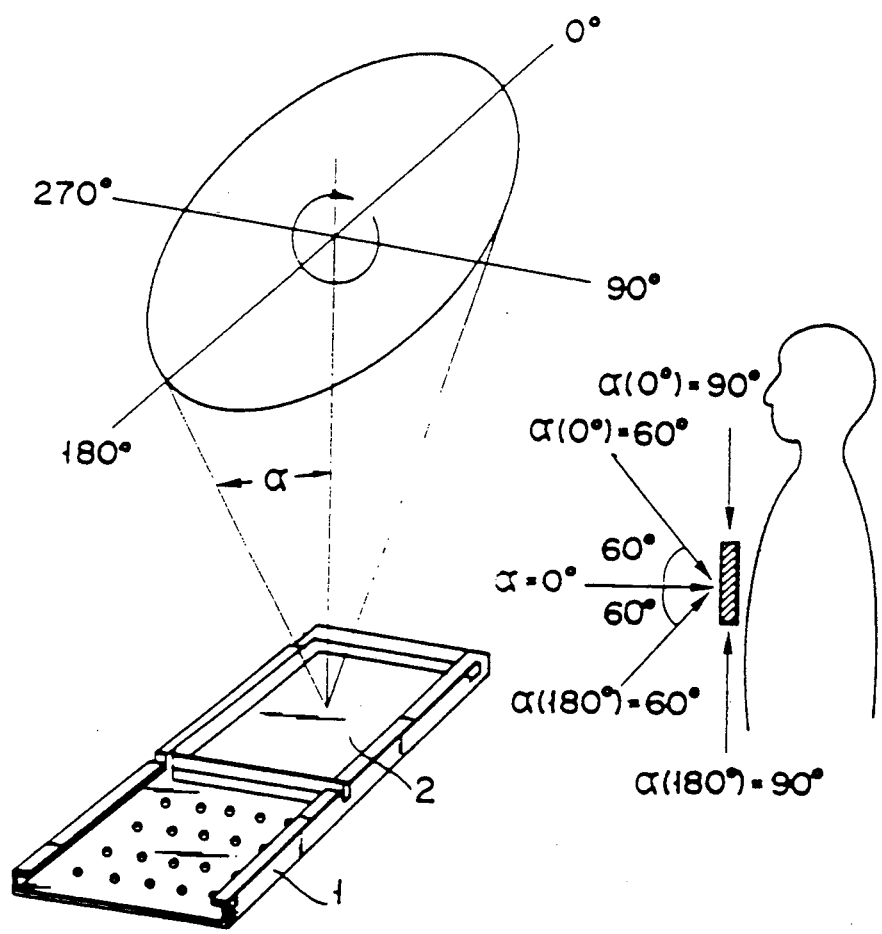
Figure 26:
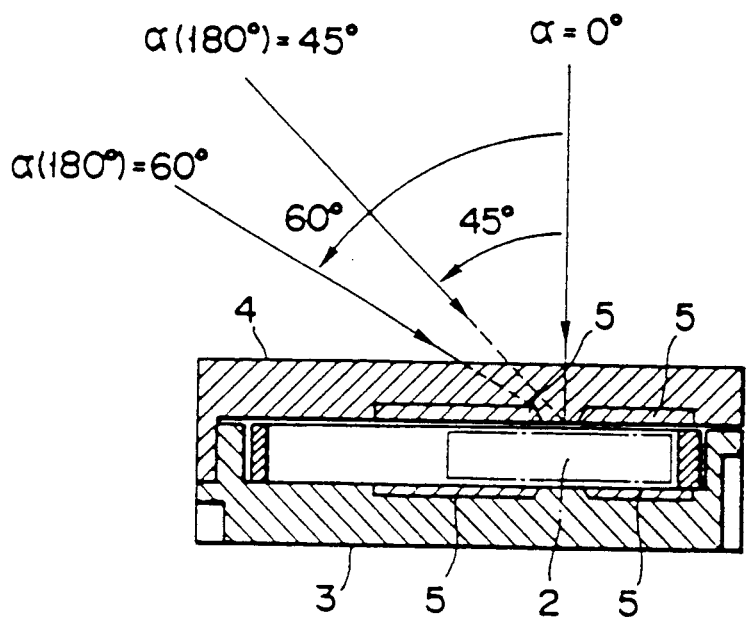
Figure 27:
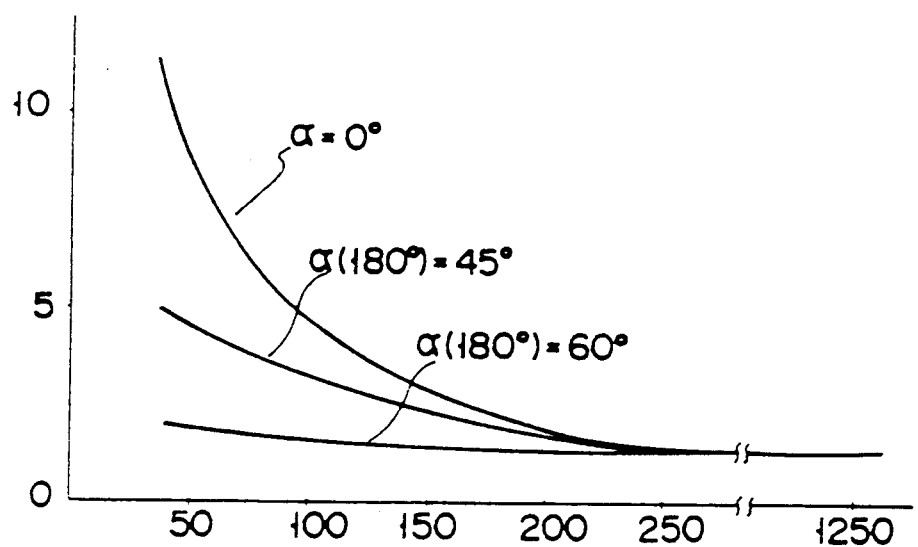
FIG. 27 is a chart of the relative sensitivity ratio with respect to the energies and explaining the problem of the prior art.

With the embodiments, the glass dosemeter is arranged as shown in FIG. 25 such that the radiation emission from the top and the bottom can be estimated. However, when in addition a second glass dosemeter is used together with the above dosemeter and is arranged so that its direction indicated by $\beta=0$ is the direction of radiation incidence of the righthand side of the body of the worker, and its direction indicated by $\beta=180°$ is the direction of radiation incidence of his lefthand side. Therefore, a quasi three-dimensional determination of the incident direction is possible, thereby increasing the determination accuracy. In addition, the improvement of the determination accuracy of the quality of radiation enables the measurement value of the exposure dose to be corrected, thereby enhancing the accuracy of dose measurement.

Various modifications are available without departing from the scope of this invention.

This invention has the following technical advantages:

With the invention the fluorescence intensity distributions at various fluorescence detecting positions and areas can be obtained by changing the detecting positions and areas of fluorescence generated from the fluorescent glass element by means of a cover mechanism.

With the aid of an evaluation device the energy of radiation and the incidence direction of radiation rays can be determined from a plurality of fluorescence intensity distributions obtained by changing the fluorescence detecting positions and areas by means of a cover mechanism, thereby ensuring a safe control of radiation exposure.

The movement of a cover plate allows the opening areas of the opening of a diaphragm and their positions to be easily changed in a plurality of steps.

The use of a diaphragm as a glass element mounting frame provides for the reduction of the constituent components and an effective use of the space in the apparatus.

With the edges of the openings tapered fluorescence from a fluorescent glass element can be detected without any influence of the thickness of a diaphragm, and the fluorescence intensity can accurately be read to calculate the fluorescence intensity distribution, and also the energy of radiation can be determined.

With the diaphragm moving mechanism the incident positions and area of ultraviolet radiation can be simply changed in a plurality of steps and the fluorescence intensity distribution can be obtained.

Also, the incident directions and areas of ultraviolet radiation can be changed and the energy of the radiation and incidence directions can be estimated, thereby ensuring the control of radiation exposure.

Still further, with the invention selected portions of the glass element can be examined by providing a hole which has an arbitrary area and size and through which ultraviolet rays pass and which can be arranged in an arbitrary position by moving one of two diaphragms each of which has an arbitrary opening.

What is claimed is:

1. In a radiation dose reading apparatus for a fluorescent glass element irradiated by ionizing radiation, said glass element having a detecting face and being adapted to be subjected to ultraviolet radiation so as to cause fluorescence depending on the radiation dose to which the glass element was exposed and means for determines the radiation dose from the intensity of fluorescence emitted from the detecting face of said fluorescent glass element, the improvement comprising: a fluorescence diaphragm arrangement overlying said detecting face, said fluorescence diaphragm arrangement comprising a diaphragm formed with an opening having a predetermined area and a movable cover plate, said movable cover plate comprising means for changing in at least three steps the fluorescence detecting areas on the detecting face of said fluorescent glass element; and fluorescence intensity reading device for obtaining the fluorescence intensity distribution from the intensity of the fluorescence emitted from the selected fluorescence detecting areas on said detecting face of said fluorescent glass element.

2. A radiation dose reading apparatus according to claim 1, further including an evaluation device for estimating the energy of radiation and/or the direction of the radiation incidence from the fluorescence intensity distribution obtained by said fluorescence intensity reading device.

3. The radiation dose reading apparatus according to claim 1 wherein said diaphragm contains also a glass element mounting frame on which said fluorescent glass element is mounted at the time of dose reading.

4. The radiation dose reading apparatus according to claim 1, wherein the edge of said opening of said diaphragm and the front part of said cover plate are provided with tapered parts extending from said fluorescent glass element towards the position at which the fluorescence is measured.

5. The radiation dose reading apparatus according to claim 1, wherein said fluorescence diaphragm arrangement comprises two diaphragms having different openings areas and different opening shapes, at least one of said diaphragms being movable to change the position and the area at the side of said fluorescence detecting face of said fluorescent glass element or at the ultraviolet radiation incident side of said fluorescent glass element.

6. A radiation dose reading apparatus in which a fluorescent glass element which was exposed to ionizing radiation is excited by ultraviolet rays and the radiation dose is determined from the intensity of fluorescence emitted from teh fluorescence detecting face of said fluorescent glass element, said apparatus comprising: an ultraviolet ray diaphragm arrangement comprising two diaphragms having different opening areas and different opening shapes, at least one of said diaphragms being movably disposed in front of said fluorescent glass element so as to change the position and the area at the side of said fluorescence detecting face of said fluorescent glass element or at the ultraviolet radiation incident side of said fluorescent glass element for changing in at least two steps the incidence areas for said ultraviolet rays in excite said fluorescent glass element; and a fluorescence intensity reading device for obtaining the fluorescence intensity distribution from the intensity of said fluorescence emitted from said fluorescence detecting face of said fluorescent glass element in accordance with a selected one of said incident areas of said ultraviolet radiation, as changed by said ultraviolet radiation diaphragm arrangement.

7. A radiation dose reading apparatus according to claim 6, further including an evaluation device for estimating the energy of radiation and/or the incidence direction of said radiation from said fluorescence intensity distribution of said fluorescent glass element obtained by said fluorescence intensity reading device.

* * * * *